(12) United States Patent
Greenberg

(10) Patent No.: US 10,432,751 B1
(45) Date of Patent: *Oct. 1, 2019

(54) CONTENT DELIVERY ACCELERATION SYSTEM

(71) Applicant: Google LLC, Mountain View, CA (US)

(72) Inventor: Don Greenberg, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/997,393

(22) Filed: Jun. 4, 2018

Related U.S. Application Data

(63) Continuation of application No. 15/241,012, filed on Aug. 18, 2016, now Pat. No. 10,015,280.

(51) Int. Cl.
*H04L 29/08* (2006.01)
*H04L 12/26* (2006.01)

(52) U.S. Cl.
CPC ............ *H04L 67/327* (2013.01); *H04L 43/16* (2013.01); *H04L 67/02* (2013.01); *H04L 67/2847* (2013.01)

(58) Field of Classification Search
CPC ... H04L 67/327; H04L 43/16; H04L 67/2847; H04L 67/02
See application file for complete search history.

(56) References Cited

U.S. PATENT DOCUMENTS

| | | | |
|---|---|---|---|
| 7,769,805 B1 | 8/2010 | Barnes et al. | |
| 8,364,611 B2 | 1/2013 | Tendjoukian et al. | |
| 9,002,828 B2 | 4/2015 | Fiatal | |
| 9,215,269 B2 | 12/2015 | Freeman et al. | |
| 9,336,538 B2 | 5/2016 | Gupta et al. | |
| 2010/0228634 A1 | 9/2010 | Ghosh et al. | |
| 2013/0124442 A1 | 5/2013 | Tendjoukian et al. | |
| 2014/0006925 A1* | 1/2014 | Bassemir | G06F 17/218 715/234 |
| 2014/0187158 A1* | 7/2014 | Boldyrev | G06Q 10/10 455/41.1 |
| 2014/0189037 A1 | 7/2014 | Stockwell et al. | |
| 2014/0059156 A1 | 9/2014 | Freeman et al. | |
| 2014/0373038 A1* | 12/2014 | Tsuji | H04N 21/44008 725/14 |
| 2014/0379835 A1 | 12/2014 | Foerster et al. | |
| 2015/0186542 A1* | 7/2015 | Singh | G06F 17/30887 715/206 |
| 2016/0014091 A1 | 1/2016 | Hiltch | |
| 2016/0014095 A1* | 1/2016 | Strayer | H04L 63/0428 713/168 |

(Continued)

*Primary Examiner* — Abdullahi E Salad
(74) *Attorney, Agent, or Firm* — Fish & Richardson P.C.

(57) ABSTRACT

This document describes a content delivery acceleration system including a communication interface configured to communicate with a remote device over a wireless network; a cache; and a controller configured to perform operations including: pre-computing one or more evaluation results for a webpage associated with a selectable network reference of a webpage, caching the one or more pre-computed evaluation results; retrieving, from the cache, the one or more pre-computed evaluation results; and pre-loading of one or more content tags for the one or more digital component slots, with the one or more content tags being preloaded with uniform resource locators (URLs) from which to load the digital components represented in the pre-computed evaluation results.

25 Claims, 6 Drawing Sheets

(56) References Cited

U.S. PATENT DOCUMENTS

| | | | |
|---|---|---|---|
| 2016/0127244 A1* | 5/2016 | Gonzalez Brenes | H04L 47/41 709/217 |
| 2016/0162095 A1* | 6/2016 | Cardonha | G06F 3/016 715/765 |
| 2016/0246895 A1* | 8/2016 | Kolam | H04L 67/2842 |
| 2016/0261676 A1* | 9/2016 | Nishimoto | G06Q 30/06 |
| 2017/0213238 A1* | 7/2017 | Bhalgat | G06Q 30/0275 |
| 2017/0293675 A1* | 10/2017 | York | G06N 5/04 |
| 2018/0189821 A1* | 7/2018 | Masson | G06Q 30/0246 |
| 2018/0197427 A9* | 7/2018 | Kim | G09B 7/00 |

* cited by examiner

CONTENT DELIVERY ACCELERATION SYSTEM

CROSS-REFERENCE TO RELATED APPLICATIONS

This application is a continuation application of and claims priority to U.S. application Ser. No. 15/241,012, filed on Aug. 18, 2016, the entire contents of which are hereby incorporated by reference.

BACKGROUND

Webpages can include links that point to addresses of other webpages. When a user that is browsing the Internet on a network resource clicks on a link, the network resource sends a request for the content of the linked webpage.

SUMMARY

This document describes techniques for accelerating the delivery of content to client devices. A content delivery acceleration system includes a communication interface configured to communicate with a remote device over a wireless network; a cache; and a controller configured to perform operations including: pre-computing one or more evaluation results for a webpage, with the one or more pre-computed evaluation results representing one or more digital components (e.g., third-party content, such as, a video clip, an audio clip, an image, text, or a combination thereof) for populating one or more digital component slots on the webpage; caching the one or more pre-computed evaluation results in the cache; and responsive to receiving a request from a system configured to serve the webpage, retrieving, from the cache, the one or more pre-computed evaluation results; and pre-loading one or more content tags for the one or more digital component slots with one or more uniform resource locators (URLs) from which to retrieve the one or more digital components represented in the one or more pre-computed evaluation results so that a latency in serving the webpage is reduced, relative to a latency in serving the webpage independent of pre-loading of the one or more content tags.

In some implementations, pre-loading the one or more content tags includes loading the one or more content tags with the one or more URLs in advance of receipt of a request from a publisher system for one or more evaluation results. In some implementations, pre-computing includes computing the one or more evaluation results in advance of receipt of a request from a publisher system for the one or more evaluation results. In some implementations, the operations of the content acceleration system further include requesting, based on the one or more pre-computed evaluation results, a digital component of the one or more digital components represented by the one or more pre-computed evaluation results for populating the one or more digital component slots on the webpage; receiving the digital component; and pre-loading the digital component for a digital component slot of the one or more digital components slots on the webpage so that a latency in serving the webpage is reduced, relative to a latency in serving the webpage independent of pre-loading the digital component.

In some implementations, causing pre-loading of the digital component enables the digital component and webpage data of the webpage to be served in a single service. In some implementations, the digital component includes an advertisement. In some implementations, the webpage includes a first webpage and the operations further include receiving webpage data from a remote system, the webpage data being for a second webpage and comprising one or more selectable network references to one or more third webpages and the first webpage; parsing the received webpage data for the one or more selectable network references; and for a particular one of the one or more selectable network references, generating, based on the parsed webpage data, prediction data representing a likelihood that the particular one of the one or more selectable network references representing the first webpage is selected.

In some implementations, generating the prediction data includes receiving a user identifier and a webpage identifier for the first webpage; receiving data comprising one or more of user click data for the first webpage, webpage data for the first webpage, and content provider data; analyzing the received data using one or more machine-learning algorithms; and returning a prediction value associated with a user for the first webpage, the prediction data comprising the prediction value.

In some implementations, the webpage data for the second webpage includes one or more search results based on a search query of a user, and the one or more selectable network references include one or more clickable links to one or more additional webpages represented by the one or more search results.

In some implementations, pre-computing the one or more evaluation results includes determining a threshold value for comparing the prediction data, the threshold value representing a specified likelihood the particular one of the one or more selectable network references is selected; and comparing the threshold value to the prediction data for the particular one of the one or more selectable network references. In some implementations, pre-computing the one or more evaluation results representing the one or more digital components includes generating callout parameters data using prior evaluation data; and performing an evaluation for each of the one or more digital component slots of the webpage based on the RTB callout parameters data.

In some implementations, the operations further include associating, with a user identifier, the one or more pre-computed evaluation results representing the one or more digital component slots associated with the webpage; caching the user identifier; returning, in response to a request for the one or more pre-computed evaluation results for the webpage from a user associated with the user identifier, the one or more pre-computed evaluation results associated with the user identifier; and deleting, from the cache, the one or more pre-computed evaluation results associated with the user identifier.

In some implementations, the content delivery acceleration system includes a communication interface configured to communicate with a remote device over a wireless network, a cache, and a means for pre-computing one or more evaluation results for a webpage, with the one or more pre-computed evaluation results representing one or more digital components for populating one or more digital component slots on the webpage. In some implementations, the content delivery acceleration system includes a means for caching the one or more pre-computed evaluation results in the cache. In some implementations, responsive to receiving a request from a system configured to serve the webpage, the content delivery acceleration system includes a means for retrieving, from the cache, the one or more pre-computed evaluation results and a means for pre-loading one or more content tags for the one or more digital component slots with one or more uniform resource locators (URLs) from which to retrieve the one or more digital components represented in the one or more pre-computed evaluation results.

The described system may provide for one or more benefits, such as serving the webpage content (e.g., publisher content) and associated digital components to the client device together so that the digital components are indistinguishable from the webpage content with respect to how and when they are served to the client device.

The details of one or more embodiments are set forth in the accompanying drawings and the description below. Other features, objects, and advantages of the techniques described herein will be apparent from the description and drawings, and from the claims.

DESCRIPTION OF DRAWINGS

Like reference symbols in the various drawings indicate like elements.

DETAILED DESCRIPTION

This document describes a system that accelerates content delivery to a client device when a client device is browsing the Internet. Typically, when a client device requests webpage content from a publisher system, several processes are initiated in response to the request. These processes, which are used to assemble the webpage that is served to the client device, include one or more requests made to various systems connected by the Internet and computations by the various systems, and take time. The content delivery acceleration system described below reduces the time latency between the request of a client device for a webpage and the assembly and service of the webpage to the client device, relative to a latency of assembling and service of the webpage to the client device independent of using the content delivery acceleration system. The content delivery acceleration system reduces the latency by completing the processes in advance of the webpage request by the client device by pre-computing and requesting data needed. In some implementations, the content acceleration delivery system pre-computes evaluation results (e.g., auction results, scoring results, or the results of another evaluation process) and requests digital components (e.g., video clips, audio clips, images, text, or a combination thereof) from the content provider system (e.g., a third-party content provider) in advance of the client device requesting the webpage. The described system may provide for one or more benefits, such as serving the webpage content (e.g., publisher content) and associated digital components to the client device together so that the digital components are indistinguishable from the webpage content with respect to how and when they are served to the client device.

Figure 1:
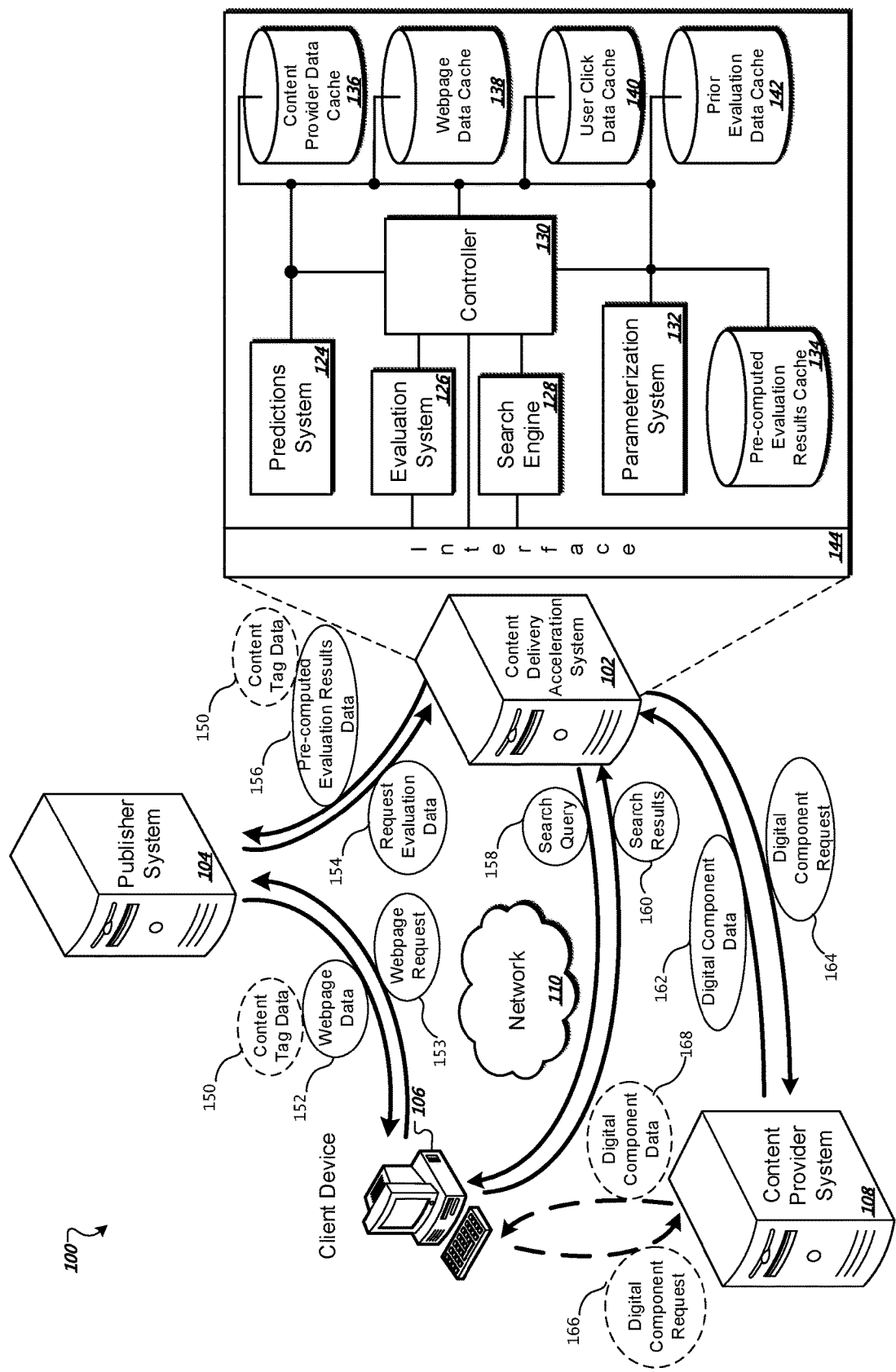
FIG. 1 is a conceptual diagram of a system for content delivery acceleration.

Referring to FIG. 1, networked environment 100 includes a content delivery acceleration system 102 that is configured to communicate (e.g., over a network 110) with a publisher system 104, a client device 106, and a content provider system 108. The content delivery acceleration system 102 includes a computing system (e.g., a server system). The content delivery acceleration system includes an interface 144, a controller 133, a predictions system 124, an evaluation system 126, a search engine 128, a parameterization system 132, a pre-computed evaluation results cache 134, a content provider data cache 136, a webpage data cache 138, a user click data cache 140, and a prior evaluation data cache 142. The content delivery acceleration system 102 is configured to respond to requests from the publisher system 104 evaluation results data, which includes content tags including network references to digital components for populating a webpage.

In some implementations, the content delivery acceleration system 102 is configured to respond to requests from the publisher system 104 or the client device 106 for content, such by sending search results 160 in response to a search query 158 or by including digital component data 162 (e.g., an advertisement) received from the content provider system 108 in the pre-computed evaluation data 156. The content delivery acceleration system 102 determines data to include in the pre-computed evaluation data 156 based on data received from the client device 106, the publisher system 104 or data that has been previously stored by the content delivery acceleration system 102, such as in the pre-computed evaluation results cache 134.

The publisher system 104 includes a computing system (e.g., a server system) that is configured to receive requests to deliver content (e.g., webpage data 152) to other systems such as the client device 106. The publisher system 104 is further configured to request data from the content delivery acceleration system 102 to fill content slots on various webpages before serving the content to the client device 106. A content slot includes a location in a webpage designated by a content tag (e.g., a digital component tag). Page assembly operations populate the content slot with a digital component based on the content tag associated with the content slot.

The client device 106 includes a computing device, such as a laptop, tablet, mobile phone, or other computing device. The client device 106 transmits requests for content (e.g., webpage data 152) from the publisher system 104. In some implementations, the client device 106 requests content, such as webpage data 152, from the content delivery acceleration system 102.

The content provider system 108 is configured to receive requests for digital components (e.g., advertisements), such as digital component request 164 and digital component request 166, and to serve the requested digital components as a response to the requests, such as sending digital component data 162 to the content delivery acceleration system 102 and sending digital component data 168 to the client device 106. In some implementations, the content delivery acceleration system 102 sends the digital component request 164 to the content provider system 108. In some implementations, the client device 106 sends the digital component request 166 to the content provider system 108.

The content delivery acceleration system 102 receives and responds to requests over the network 110 (e.g., the Internet) for one or more of evaluation data 154, search results 158, content tag data 150, and other data using several modules and subsystems. The content delivery acceleration system 102 includes the communication interface 144 configured to communicate with one or more of the publisher system 104, the client device 106, or the content provider system 108 over the network. The communication interface 144 communicates data of the received requests from the network to one or more subsystems or modules of the content delivery acceleration system 102, such as the evaluation system 126, the search engine 128, or the controller 130.

The controller 130 analyzes the data being processed by the content delivery acceleration system 102 and route data to an appropriate subsystem, such as the predictions system 124, the parameterization system 132, the evaluation system 126, or the search engine 128. The controller 130 stores data (e.g., for future operations) in one or more caches of the content delivery acceleration system 102 and sends the stored data to the subsystem that requests the data. In some implementations, the one or more caches include content provider data cache 136, webpage data cache 152, user click data cache 140, and prior evaluation data cache 142.

The predictions system 124 uses the data from the one or more caches to make predictions of which webpage will be requested 153 by the client device 106 from the publisher system 104, and in turn, which evaluation data will be requested by the publisher system 104 in the evaluation data request 154. In some implementations, the predictions system 124 analyzes the webpage data 152 recently requested by the client device 106 and makes a prediction of the next webpage that will be requested by the client device 106. The predictions system 124 sends the prediction to the parameterization system 132 using the controller 130. The parameterization system 132 populates callout parameters for the predicted webpage and sends the parameters to the evaluation system 126.

The evaluation system 126 pre-computes the evaluation data before the client device 106 requests the predicted webpage from the client device 106. In some implementations, pre-computing the evaluation results data 156 includes a process wherein the evaluation system 126 runs the evaluation and determines the results of the evaluation in advance of receipt of a request 154 for evaluation data from the publisher system 104 for the evaluation results. When the publisher system 104 requests the evaluation data 154, the content delivery acceleration system 104 responds using the pre-computed evaluation data 156 without the latency caused by performing the evaluation.

In some implementations, when the client device 106 sends a webpage request 153 to the publisher system 104, the publisher system 104 requests the evaluation data 154 from the content delivery acceleration system 102. The content delivery acceleration system 102 responds to the request for the evaluation data 154 by sending the pre-computed evaluation results data 156 to the publisher system 104. Since the evaluation results are pre-computed, rather than computed upon request, the latency experienced by the publisher system 104 and thus the client device 106 is reduced relative to the latency experienced independent of pre-computing the evaluation results.

Once the evaluation results are pre-computed and the digital components for populating the content slots are determined, the content delivery acceleration system pre-loads one or more content tags with the network references (e.g., URL links) associated with the digital components. Pre-loading one or more content tags includes a process wherein the content delivery acceleration system 102 loads the content tags with one or more network references (e.g., URLs) in advance of receipt of a request for one or more evaluation results from the publisher system 104. When the publisher system 104 requests the evaluation data 154, the content delivery acceleration system 102 responds by sending the pre-computed evaluation data 156 and the content tag data 150 including the pre-loaded content tags.

The content delivery acceleration system 102 generates predictions of which data will be requested by the publisher system 104 or the client device 106. The prediction is made by the predictions system 124 using data received by the content delivery acceleration system 102 from a remote system (e.g., a remote device), such as the publisher system 104 or the client device 106. The content delivery acceleration system 102 receives data identifying which webpage has most recently been requested by the client device 106. In some implementations, the request data is gathered from an application of the client device 106, such as a browser application. In some implementations, the content delivery acceleration system 102 includes a server that served webpage data 152 to the client device 106. For example, the client device 106 sends a search query 158 to a server of the content delivery acceleration system 102. The search engine 128 of the content delivery acceleration system 102 returns the search results 160 to the client device 106. When the client device 106 sends search query 158 to the content delivery acceleration system 102, the content delivery acceleration system 102 already has the webpage data associated with the identified webpage most recently requested by the client device 106. If the requested data is gathered from an alternative source, such as a web browser application, the content delivery acceleration system 102 searches a webpage data cache 138 of content delivery acceleration system 102 to check if the webpage data 152 associated with the identified webpage is already available. If the webpage data 152 is not in the cache, the content delivery acceleration system 102 requests the webpage data 152 from a publisher system 104 associated with the webpage.

Once the content delivery acceleration system 102 receives the webpage data 152 of the identified webpage, the content delivery acceleration system 102 parses the webpage data 152 to determine whether there are one or more selectable network references (e.g., clickable URL links) in the webpage data 152. The selectable network references include links to additional webpages, digital components, or other web addresses (e.g. URL links). In some implementations, search results 160 data include the selectable network reference. In some implementations, digital component data includes the selectable network references. In some implementations, the content of the webpage data includes the selectable network reference. The content delivery acceleration system 102 determines, based on the parsed webpage data, a list of additional webpages including webpage data 152 that will potentially be requested by the client device 106.

In some implementations, as a user manipulates a webpage, more additional links are identified. For example, if a user scrolls down a webpage and more webpage data 152 is requested from the publisher system 104, the content delivery acceleration system 102 continuously gathers the webpage data 152 and add additional webpages to the list for analysis by the predictions system 124.

The predictions system 124 determines, using the list of additional webpages, likelihoods that webpage data 152 from webpages of the list of webpages will be requested by the client device 106. In some implementations, the client device 106 requests webpage data 152 when a user of the client device 106 activates or otherwise selects (e.g., clicks) on the selectable network reference including an address corresponding to the webpage data 152. In some implementations, the predictions system 124 determines a likelihood of selection of a link for each webpage in the list of additional webpages. In some implementations, the predictions system 124 determines a likelihood of selection of a link for each of a subset of the webpages in the list of additional webpages.

The predictions system 124 includes a machine-learning system for analyzing the data about an additional webpage and the client device 106 and subsequently generating predictions data on the likelihood that the webpage data 152 of the additional webpage will be requested. The predictions system 124 trains using data from prior search queries of one or more users, including the user of the client device 106. The predictions system 124 trains using data collected from the browser application, such as user click data. The predictions system 124 uses data associated with the webpage (e.g., the webpage most recently requested by the client device 106) or the additional webpage, such as content of the webpage loaded from the webpage data cache 138. The predictions system 124 trains using the user click data of one or more digital components. The predictions system 124 trains the machine-learning algorithms, e.g., on a batch basis, an ongoing basis and so forth. The predictions system 124 uses other methods of training based on data stored by the content delivery acceleration system 102 using one or more known machine-learning algorithms.

In some implementations, a mismatch occurs between the selectable network references of the additional webpages and evaluation results page links (e.g., URLs) due to redirects of the client device 106. The predictions system 124 trains using user click data and prior evaluation data (e.g., auction logs) for generating the predictions data.

The predictions system 124 generates an array of confidences for one or more of the additional webpages. The predictions system 124 receives an identifier of the user or client device 106. The predictions system 124 receives an identifier of the webpage, e.g., the parsed webpage. In some implementations, the predictions system 124 receives user identifier-webpage identifier pairs from the controller 130. The predictions system 124 generates predications data including one or more confidence scores for predicted webpages (e.g., additional webpages of the list of additional webpages). A confidence score represents the likelihood that the user will select a link representing the additional webpage (e.g., that the client device 106 will request the additional webpage data 152). In some implementations, the predictions data includes a sorted array of additional page identifier-confidence score pairs. The confidence score includes a scaler, normalized value.

The predictions system 124 applies a threshold of certainty to the confidence scores of the predictions data generated by the predictions system 124. The predictions system 124 choses the threshold based on the machine-learning algorithms described above such that not too many additional webpages are excluded from the predictions data but also to prevent unnecessary parametrization. In some implementations, the threshold includes a selection of a set number of additional webpages identifiers for sending to the parameterization system 132. In some implementations, the threshold includes a set scalar value of the confidence scores. In some implementations, the threshold varies based on the machine learning algorithms described above.

The controller 130 sends the predictions data including the user identifiers and the additional webpage identifiers to the parameterization system 132. The parameterization system 132 includes a machine-leaning system that populates the eligibility values (e.g., RTB callout parameters) for each of the additional webpages identified by the predictions system 124. In some implementations, the parameterization system 132 uses eligibility logic (e.g., RTB business logic), such as platform identification signals. The parameterization system 132 generates and associates eligibility values with each of the additional webpages identified by the predictions system 124 such that the evaluation system 126 runs a digital component evaluation for the additional webpage. In some implementations, the parameterization system 132 generates an eligibility values for each of the digital component slots for an additional webpage. The parameterization system 132 trains using evaluation data from one or more content evaluations. In some implementations, more popular webpages will be better trained than less popular webpages, and have better eligibility values. In some implementations, the evaluation system 126 (e.g., an ad exchange) includes a third-party evaluation system. The parameterization system 132 sends the eligibility values to the evaluation system 126 via the controller 130.

The evaluation system 126 receives the eligibility values and runs an evaluation process (e.g., auction, scoring process, or another evaluation technique) for the digital components represented by the eligibility values. In some implementations, the evaluation system 126 includes a third-party evaluation system. The evaluation system 126 runs an evaluation process for each of the predicted webpages and generates pre-computed evaluation results data 156. The pre-computed evaluation results data 156 represents digital components for populating one or more digital component slots on the predicted webpages. In some implementations, the pre-computed evaluation results data 156 includes one or more links to network resources (e.g., URLs), the resources configured to serve the digital components associated with the predicted webpage and requested by the publisher system 104 when the client device 106 requests the additional webpage data 152 from the publisher system 104.

The pre-computed evaluation results cache 134 stores a pre-computed evaluation results data 156 for a predicted webpage for later retrieval, such as if the client device 106 requests the predicted webpage from the publisher system 104. In some implementations, the pre-computed evaluation results data 156 includes content tags for digital components slots of a single predicted webpage for each user (e.g., client device 106). In some implementations, the pre-computed evaluation results data 156 includes content tags for digital components slots for several or all of the predicted webpages. In some implementations, the content delivery acceleration system clears the pre-computed evaluation results cache 134 after querying the pre-computed evaluation results cache 134 for pre-computed evaluation results data 156, whether the pre-computed evaluation results data 156 was found (e.g., a cache hit) or not found (e.g., a cache miss). In some implementations, the evaluation system 126 sends the content tag data 150 of the pre-computed evaluation results data 156 to the publisher system 104 without storing the content tag data 150 in the pre-computed evaluation results cache 134.

Table 1, below, shows an example of the data received by the predictions system 124 and the parameterization system 132 and the data generated by the predictions system 124 and the parameterization system 132.

TABLE 1

| User ID/Webpage ID | Predictions Data (Additional Webpage ID/ Confidence Score) | User ID/ Additional Webpage ID | Eligibility Values |
|---|---|---|---|
| [user_id, p_0] | [(p_1, confidence_1), | [(user_id,p_1), | [user_id, p_1, RTB_1, RTB_2... RTB_N] |

TABLE 1-continued

| User ID/Webpage ID | Predictions Data (Additional Webpage ID/ Confidence Score) | User ID/ Additional Webpage ID | Eligibility Values |
|---|---|---|---|
| | (p_2, confidence_2)... | (user_id,p_2)] | [user_id, p_2, RTB_1, RTB_2... RTB_N] |
| | (p_n, confidence_n)] | N/A (Confidence too low) | N/A (Confidence too low) |

The controller 130 manages dataflow between modules and subsystems of the content delivery acceleration system 102. The controller 130 handles the search results 160 data from the search engine 128 and pre-computed evaluation results data 156 from the evaluation system 126. The controller 130 routes the predictions data to the parameterization system 132 and the RTB parameters data to the evaluation system 126. In some implementations, the controller 130 stores data as required into one of the one or more caches. For example, in some implementations, the controller 130 stores pre-computed evaluation results data 156 in the pre-computed evaluation results cache 134. The controller 130 stores webpage data (e.g., webpage data 152) in the webpage data cache 138, evaluation logs in the prior evaluation data cache 142, user click data in the user click data cache 140, digital components data in the content provider data cache 136, and so forth.

The search engine 128 includes one or more computing devices (e.g., servers) configured to receive a search query 158 and return search results 160 from the Internet. The search results 160 include a mix of webpages, images, and other types of files. The search engine 128 also mines data available in databases or open directories. The search engine 128 maintains real-time information by running an algorithm on a web crawler. In some implementations, the search engine 128 includes a third-party search engine 128. In some implementations, the search results 160 generated by the search engine 128 include one or more digital components including links to webpages of entities (e.g., bidders) associated with the digital component slot.

The content provider data cache 136 includes a data store in memory or on disk, e.g., a database such as a distributed database. The content provider data cache 136 includes data representing one or more digital components that have been requested from and returned by a content provider system 108. In some implementations, the content delivery acceleration system 102 requests one or more digital components from the content provider system 108 based on the one or more content tags of the pre-computed evaluation results data 156. The content delivery acceleration system 102 sends the digital component data 162 to the publisher system 104 in place of or in addition to the digital component tags of the pre-computed evaluation results data 156 requested by the publisher system 104.

Generally, digital component data 162 includes images, text, videos, and so forth. In this implementation, content provider data cache 136 stores digital component data 162. When the publisher system 104 responds to the additional webpage request 153 by the client device 106 by sending the webpage data 152, the webpage data 152 includes the digital component data 162. The client system 106 receives the webpage data 152 and the digital component data 162 without the client device 106 sending a digital component request 166 to the content provider system 108 or waiting for the digital component data 168 from the content provider system 108.

The publisher system 104 assembles the webpage and serves the webpage to the client device 106 in the first service when the publisher system 104 receives the digital component data 162 from the content delivery acceleration system 102. The content delivery acceleration system 102 reduces latency for responding to the webpage request 153 relative to the latency for responding independent of pre-computing the evaluation results. This is because the client device 106 does not need to wait for the evaluation system 126 to run an evaluation process for the digital component slots associated with the additional webpage, as the evaluation results have been pre-computed. The content delivery acceleration system further reduces latency of presentation of the digital components to a user of the client device 106 relative to the latency of the presentation of the digital components independent of pre-loading the digital components data to the webpage data 152 (e.g., retrieving the digital components in advance of the webpage request and assembling the webpage with the digital components in the digital component slots) because the client device 106 does not need to send a request to the content provider system 108 and wait for a response before loading the digital components. The publisher system 104 has already received the digital components data in response to the request for webpage data 152.

Additionally, when the publisher system 104 assembles the webpage and serves the entire webpage directly to the client device 106 in the first service, the client device 106 and browser applications (e.g. ad-blocking software) of the client device 106 cannot distinguish between content that is generated by the publisher and digital components generated by the content provider system 108 because the client device 106 receives the content in response to the same request. A content-blocking mechanism cannot selectively block digital components based on the additional requests sent to the content provider system 108 by the client device 106 because the client device 106 does not need to request 164 digital components data from the content provider system 108.

The webpage data cache 138 stores webpage data 152 and includes a database or distributed database. The webpage data 152 stored by the webpage data cache 138 includes the webpage data 152 of the webpage that was most recently requested by the client device 106 for later parsing for selectable network references as described above. In some implementations, the webpage data cache 138 stores webpage data 152 for one or more of the additional webpages for use in generating predictions data, generating eligibility values, and so forth. In some implementations, the webpage data cache 138 stores webpage data 152 from any webpage that is analyzed, crawled, or otherwise accessed by modules or subsystems of the content delivery acceleration system 102. In some implementations, the webpage data 152 in the webpage data cache 138 trains the predictions system 124.

The user click data cache 140 stores user click data for one or more webpages. The user click data cache 140 includes a database or distributed database. The content delivery acceleration system 102 populates the user click data cache 140 using data gathered by an application on a client device 106, such as a browser. The user click data includes data representing what links, digital components, etc. have been click on, activated, etc. by one or more users. In some implementations, the click data shows that some links are clicked on more frequently relative to other links on a webpage. The user click data trains the predictions system 124 for generating predictions data and confidence scores.

The prior evaluation data cache 142 stores evaluation log data for one or more webpages. The prior evaluation data cache 142 includes a database or distributed database. The evaluation log data trains the predictions system 124. In some implementations, the evaluation log data and user click data train the predictions system 124 in case of mismatches between links and evaluation results page URLs due to redirects of the client device 106.

The pre-computed evaluation results cache 134 stores pre-computed evaluation results data 156 for third-party content evaluations run by the evaluation system 126. When the client device 106 requests a webpage 153 and the publisher system 104 requests evaluation results data, the content delivery acceleration system 102 provides the pre-computed evaluation results data 156 from the pre-computed evaluation results cache 134. In some implementations, when the content delivery acceleration system 102 queries the pre-computed evaluation results cache 134 for pre-computed evaluation results data 156, the content delivery acceleration system 102 clears a cache line of the client device 106, wherein the cache line includes data in the pre-computed evaluation results cache 134 associated with the user or client device 104.

The publisher system 104 includes a server or network of servers that host webpage content. The publisher system 104 can include a commercial hosting service or an individual server. The publisher system 104 serves webpage data 152 to the client device 106 in response to requests for webpage data 152 from the web addresses hosted by the publisher system 104. When a client device 106 requests webpage data 152, the publisher system 104 sends a request for evaluation data 154 from the content delivery acceleration system 102 to populate any digital component slots of the requested webpage with digital component tags so that the client device 106 fetches the digital components for the webpage once the webpage has been served. The publisher system 104 requests the evaluation data from the content delivery acceleration system 102. The controller 130 of the content delivery acceleration system 102 handles the request by checking the pre-computed evaluation results cache 134 for pre-computed evaluation results data 156 associated with the webpage and user being served by the publisher system 104. If the content delivery acceleration system 102 finds pre-computed evaluation results data 156 in the pre-computed evaluation results cache 134, the content delivery acceleration system 102 sends the pre-computed evaluation results data 156 to the publisher system 104. The content delivery acceleration system 102 does not need to run an evaluation process for the requested webpage digital components in response to the request because the evaluation process has already been run by the evaluation system 126. The pre-computed evaluation results data 156 are sent to the publisher system 104, which serves the requested webpage to the client device 106. The content delivery acceleration system reduces latency between the request by the client device 106 for the webpage data 152 and serving of the webpage by the publisher system 104 relative to the latency independent of pre-computing the evaluation results and pre-loading the content tags because the evaluation system 126 does not have to run the evaluation in response to the request.

In some implementations, the publisher system 104 sends webpage data 152 and content tag data 150 to the client device 106 in response to receiving the webpage request 153. The content tag data 150 includes one or more content tags that have been pre-loaded with one or more network references representing digital components chosen by the evaluation system 126 and can be used to send a digital component request 166 to the content provider system 108 by the client device 106 or a digital component request 164 to the content provider system 108 by the content delivery acceleration system 102. The publisher system 104 sends a request 154 for evaluation data from the content delivery acceleration system 102. In some implementations, the content delivery acceleration system responds by sending the pre-computed evaluation data 156, if found in the pre-computed evaluation results cache 134, in addition to the content tag data 150. The publisher system 104 assembles the received pre-computed evaluation data 156 and content tag data 150 with the webpage and sends the webpage data 152 and the content tag data 150 to the client device 106 together. In some implementations, the content delivery acceleration system 102 has already retrieved the digital component data 162 from the content provider system. Generally, the digital component data 162 includes text, images, videos, or other such data for populating a digital component slot of a webpage. The content delivery acceleration system 102 sends the pre-computed evaluation data 156 including the digital component data 162 to the publisher, and the content delivery acceleration system 102 does not send the content tag data 150 (shown in dashed lines in FIG. 1) because the digital component data 162 has already been retrieved from the content provider system 108 for the additional webpage and the content tag data 150 is not necessary for serving the digital component data 162.

The client device 106 includes a laptop, tablet, mobile phone, or other computing device configured to communicate with the publisher system 104 and the content delivery acceleration system 102. The client device 106 sends a request to a publisher system 104 for a webpage, and receives webpage data 152 from the publisher system 104 in response to the request. In some implementations, the client device 106 sends a search query 158 to the content delivery acceleration system 102 and receives search results 160 as a response from the content delivery acceleration system 102. In some implementations, the client device 106 receives webpage data 152 and content tag data 150 from the publisher system 104 in response to a webpage request 153. In some implementations, the webpage data 152 includes data and metadata used for rendering a webpage. A webpage request 153 can include data requesting that the publisher system 104 send the webpage data 152 to the client device 106. In some implementations, the client device 106 receives content tag data 150 including one or more content tags loaded with one or more network references to one or more digital components. In response to receiving the content tag data 150, the client device 106 sends a digital component request 166 to the content provider system 108 for digital component data 168. In response to the digital component request 166, the content provider system 108 sends the digital component data 168. In a variation, if the webpage data 152 sent by the publisher system 104 does not include content tag data 150 (as shown by dashed lines in FIG. 1), or the webpage data 152 from the publisher system 104 already includes the digital component data 162, the client device 106 does not need to send a digital component request 166 to the content provider system 108 for the digital component data 168, as shown by the dashed lines of FIG. 1.

The content provider system 108 includes a server or a network of servers, or similar computing device(s). The content provider system 108 provides digital component data 162 to the client device 106 or to the content delivery acceleration system 102 when requested. In some implementations, the content delivery acceleration system 102 requests 164 digital component data 162 from the content provider system 108. The content delivery acceleration system 102 stores the digital component data 162 in a content provider data cache 136. In some implementations, the content delivery acceleration system 102 requests digital components from the content provider system 108 after performing an evaluation using the evaluation system 126 for one or more webpages (e.g., identified additional webpages). In some implementations, the client device 106 requests digital component data 162 from the digital component system in response to receiving content tags included in webpage data 152 from the publisher system 104.

Figure 2:
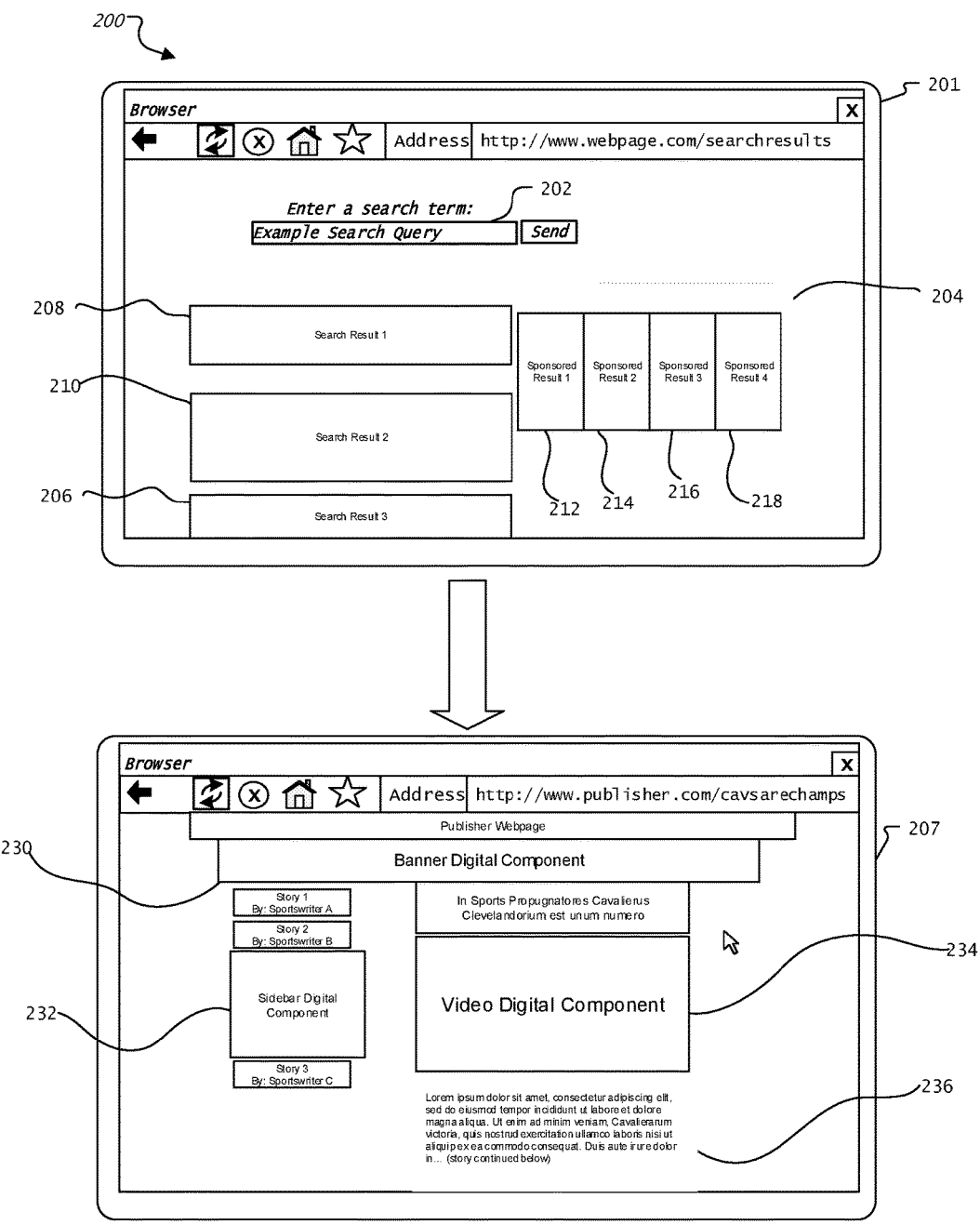
FIG. 2 shows graphical user interfaces for rendering content.

Referring to FIG. 2, diagram 200 shows graphical user interfaces 201, 207 that are rendered at least partly based on data from a content delivery acceleration system. Graphical user interface 201 is rendered in a browser. The browser collects data on the user's click rates, browsing history, current webpage address, and other information that is stored by a content delivery acceleration system (e.g., content delivery acceleration system 102 in FIG. 1) and used for training of the predictions system, parameterization system, etc. In some implementations, the user enters a search query 202 onto the webpage. In some implementations, the content delivery acceleration system 102 hosts the search webpage. The content delivery acceleration system 102 receives the search query and provides a search results webpage 204. The search results webpage 204 includes text links such as link 208 (e.g., a search result). In some implementations, the search results webpage 204 includes embedded webpage data 210 representing a link to an additional webpage. In some implementations, the search results webpage 204 includes images 206 that include links to one or more additional webpages. In some implementations, the search results webpage 204 includes one or more digital components 212, 214, 216, and 218 that each represent a link to additional webpages (e.g., sponsored results). The content delivery acceleration system 102 parses this generated search results webpage 204 for the links described above and predicts which of the additional webpages represented by the parsed links is more likely (e.g., most likely) to be selected next by the user than other additional webpages represented by the links.

Graphical user interface 207 shows an example of a browser with the received webpage including the additional webpage for link 208. The additional webpage includes publisher content 236 and digital components 230, 232, and 234.

In some implementations, if most users select the first link in the search results, link 208 has a higher likelihood than the other links on the page. The predictions system could determine that link 208 "Search Result 1" the most likely link to be selected from the search results webpage and that the likelihood meets a threshold value indicating, for example, that pre-computing evaluation results data would be worthwhile. In addition, the predictions system determines that link 210 "Search Result 2" is also likely to be selected by the user. However, the predictions system may determine, in this example, that the digital components containing sponsored results 212, 214, 216, and 218 will probably not be selected above a designated threshold likelihood. The controller sends the user identifier-additional webpage identifier pair and additional webpage data to the parameterization system for the additional webpages represented by links 208, 210. In this example, the parameterization system determines eligibility values for the additional webpages "Search Results 1" at "http://www.publisher.com . . ." and "Search Result 2" at "https://www.publisher2.com" but not the other additional webpages. While the user is still viewing search results webpage 204, the controller of the content delivery acceleration system 102 sends the determined eligibility values to the evaluation system and run the evaluation to determine the content tags for the additional webpages 208, 210 and pre-load the content tags with links (e.g., URLs) to digital components represented by the evaluation results data. In some implementations, the results are stored in a pre-computed evaluation results cache.

In some implementations, the user of the client device may select the link 218 and request the additional webpage from the publisher system (e.g., Sponsored Result 4). The publisher system requests the evaluation results data from the content delivery acceleration system. In this example, the content delivery acceleration system has not pre-computed evaluation results data for webpage 218. The evaluation system runs an evaluation process for the additional webpage 218 and the content delivery acceleration system loads the content tags with links (e.g., URLs) for the digital components identified in the evaluation results data and sent to the publisher system. The publisher system servers the publisher content 236 of the webpage and content tags to the client device. The client device requests the digital components data for banner digital component 230, sidebar digital component 232, and video digital component 234 from the content provider system and receives the requested digital components.

In other implementations, the user of the client device selects the link 208 and requests the additional webpage from the publisher system (e.g., Publisher). The publisher system requests the evaluation results data from a content delivery acceleration system (e.g., content delivery acceleration system 102). In this example, the content delivery acceleration system has pre-computed evaluation results data for the webpage represented by link 208 because it was identified by the predictions system. The content delivery acceleration system has pre-loaded the content tags with links (e.g., URLs) for the digital components 230, 232, and 234 identified in the evaluation results data and sends the content tags to the publisher system. The publisher system serves the webpage data and content tags are served to the client device. The client device requests the digital components data for banner digital component 230, sidebar digital component 232, and video digital component 234 from the content provider system and receives the requested digital components data. The content delivery acceleration system thus reduces or eliminates a latency that would be caused by waiting for the evaluation system to run the evaluation process and load the content tags with the links.

In some implementations, once the evaluation system has run the evaluation, the content delivery acceleration system requests the digital component data from the content provider system in advance of the publisher system requesting the evaluation results data. The content delivery acceleration system requests the digital components data specified by the pre-computed evaluation results data and the content provider system returns the requested digital component(s) data. The content delivery acceleration system stores the digital components data in the content provider data cache. When the publisher system requests the evaluation results for an additional webpage, the content delivery acceleration system instead returns the digital component data, which is assembled into the webpage data and served to the client device in the first service.

In other implementations, the user of the client device selects the link 208 and requests the additional webpage from the publisher system (e.g., Publisher). The publisher requests the evaluation results data from the content delivery acceleration system. In this example, the content delivery acceleration system has pre-computed evaluation results data for webpage 208 because it was identified by the predictions system. Furthermore, in this example, the content delivery acceleration system has already received and stored the digital components data for banner digital component 230, sidebar digital component 232, and video digital component 234 in the content provider data cache. The content delivery acceleration system responds to the publisher system with the digital components data. The publisher system assembles the digital components data into the webpage data with the publisher content 236 and serves the webpage to the client device together (e.g., in a single service). This process reduces or eliminates the latency of serving the webpage, relative to the latency that would have been caused by waiting for the evaluation system to run the evaluation and to load the content tags. This process reduces or eliminates the latency of waiting for the client device to request and receive the digital components data during the serving the additional webpage with the digital components data for the banner digital component 230, sidebar digital component 232, and video digital component 234. Additionally, since the digital components have been served with the publisher content 236, browser cannot distinguish between the digital components 230, 232, and 234 and the publisher content 236 using the conventional requests to the content provider system as an identifier.

Figure 3:
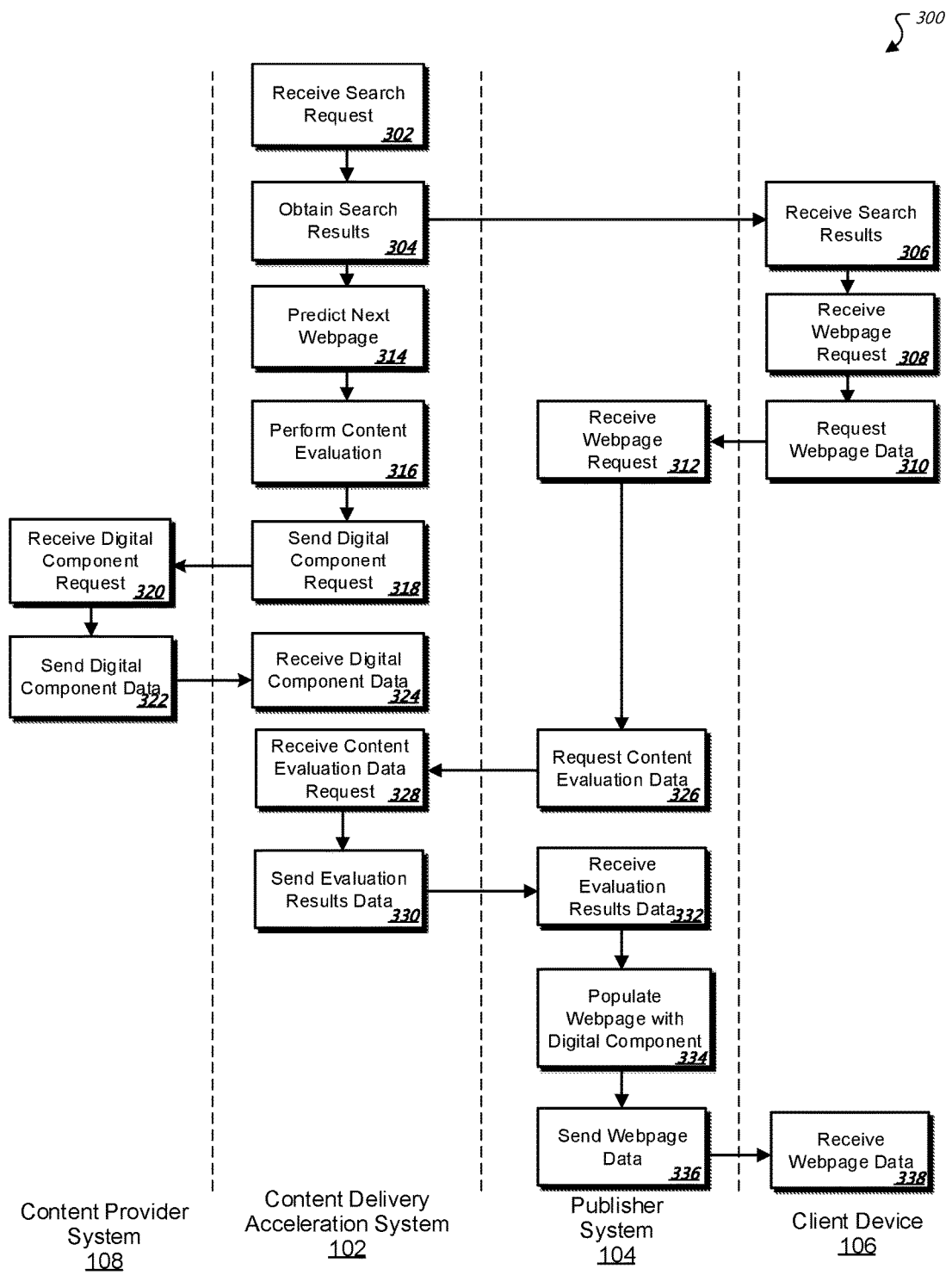
FIGS. 3-5 are flowcharts showing actions taken for content delivery acceleration.

Referring to FIG. 3, diagram 300 shows example actions taken for content delivery acceleration by each of the content provider system 108, the content delivery acceleration system 102, the publisher system 104, and the client device 106. In the example shown by diagram 300, the content delivery acceleration system 102 receives (302) a search request. The content delivery acceleration system 102 obtains (304) the search results using, for example, a search engine (e.g., search engine 128). The content delivery acceleration system 102 (or a portion of the content delivery acceleration system 102, such as, e.g., the predictions system 124 in FIG. 1) predicts (314) the next webpage that will be requested by the client device 106. The content delivery acceleration system sends (306) search results to the client device 106. The content delivery acceleration system 102 determines the eligibility values and performs (316) an evaluation process using the evaluation system. The determination and evaluation performance (316) occur during a period of time before the client device 106 requests another webpage (e.g., while the user of the client device 106 views the search results). Once the evaluation system determines the digital components for the webpage, the content delivery acceleration system 102 requests (318) the digital components from the content provider system 108. The content provider system 108 receives (320) the request for the digital components and sends (322) the corresponding digital components data to the content delivery acceleration system 102. The content delivery acceleration system 102 receives (324) the digital components data and waits for a request from the publisher system 104.

Once the user of the client device 106 selects a link and requests (308) the additional webpage data, the client device 106 sends (310) the request to the publisher system which receives (312) the request and sends (326) a request for evaluation results data from the content delivery acceleration system 102. The content delivery acceleration system 102 receives (328) the request and sends (330) the evaluation results data, which includes the digital components data received (324) earlier. The publisher system 104 receives (332) the evaluation results data and populates (e.g., assembles) (334) the webpage with the digital components data and sends (336) the webpage data to the client device 106. The client device 106 receives (338) the webpage data in response to the request.

Figure 4:
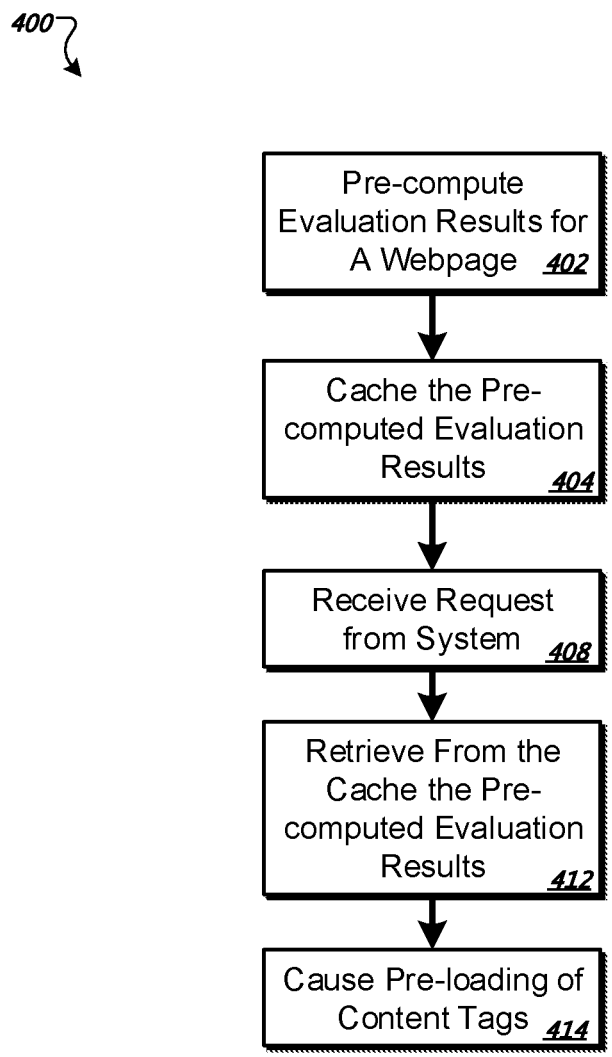

Referring to FIG. 4, content delivery acceleration system 102 (FIG. 1) implements process 400 in executing content delivery acceleration. In operation, content delivery acceleration system 102 pre-computes (402) evaluation results data by running a third-party content evaluation process for the digital component slots of a predicted webpage. The content delivery acceleration system 102 caches (404) the pre-computed evaluation results. The content delivery acceleration system 102 receives (408) a request from a system configured to serve the webpage for which the content delivery acceleration system 102 pre-computed the evaluation results. In response, the content delivery acceleration system 102 retrieves (412) the pre-computed evaluation results from the cache. The content delivery acceleration system 102 causes (414) the pre-loading of the content tags, for the content slots associated with the webpage, with uniform resource locators (URLs) specifying from where to request the one or more digital components represented in the one or more pre-computed evaluation results so that a latency in serving the webpage is reduced by the content delivery acceleration system, relative to a latency in serving the webpage independent of pre-loading of the one or more content tags.

Figure 5:
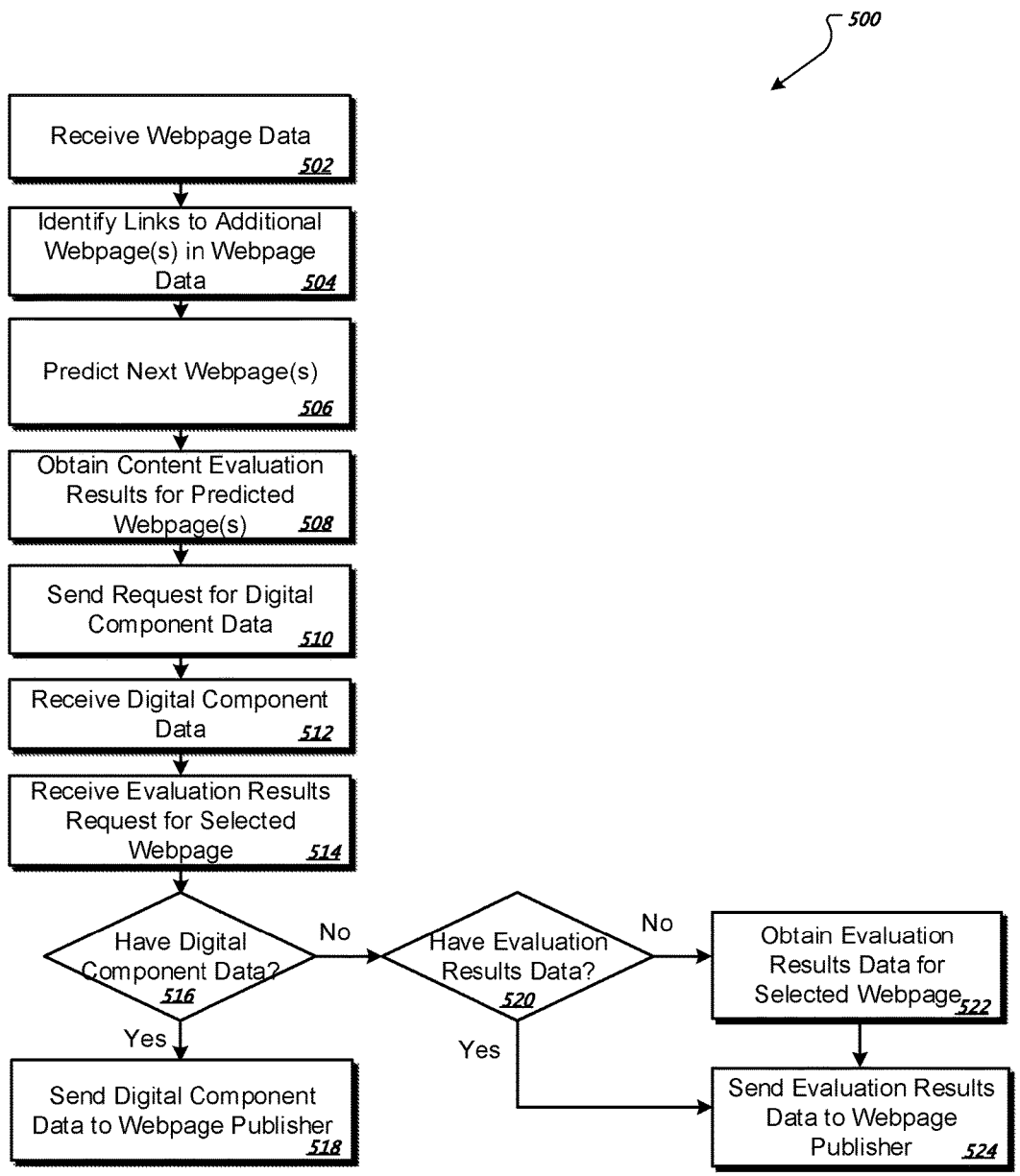

Referring to FIG. 5, content delivery acceleration system 102 (FIG. 1) implements process 500 in executing content delivery acceleration. In operation, the content delivery acceleration system 102 receives (502) webpage data. The content delivery acceleration system 102 parses webpage data to identify (504) links to additional webpages in the webpage data. The content delivery acceleration system 102 predicts (506) which webpage will be requested next by the client device (e.g., client device 106). The content delivery acceleration system 102 runs (508) the content evaluation for the digital component slots of the predicted webpage. The content delivery acceleration system 102 uses the evaluation results to identify content data to request, and sends (510) a request for the content data. The content delivery acceleration system 102 receives (512) the digital component data. When the content delivery acceleration system 102 receives (514) a request for evaluation results for a selected webpage, the content delivery acceleration system 102 determines (516) whether digital component data is available for sending to the publisher system. If the content data is available, the content delivery acceleration system 102 sends (518) the digital component data to the webpage publisher. If the digital component data is not available, the content delivery acceleration system 102 determines (520) whether evaluation results data are available for the selected webpage. If the evaluation results are available, the content delivery acceleration system 102 sends (524) content tags including links to digital components represented in the evaluation results data to the publisher system (e.g., publisher system 104). If the evaluation results are not available, the content delivery acceleration system 102 runs the evaluation process for the selected webpage and obtains (522) the evaluation results. The content delivery acceleration system 102 sends (524) the evaluation results to the publisher system.

Figure 6:
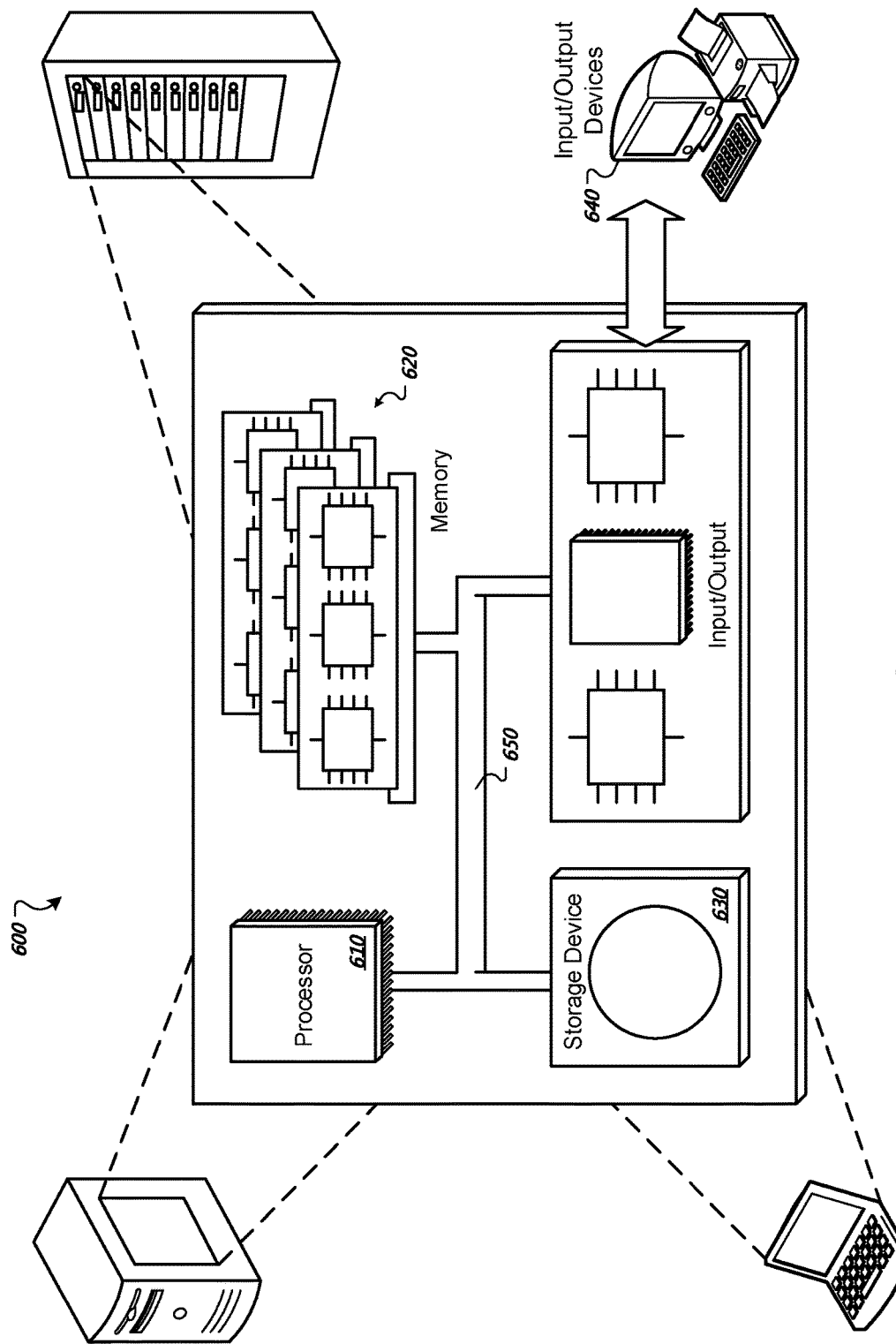
FIG. 6 is a block diagram of components of a system for content delivery acceleration.

FIG. 6 is a schematic diagram of a system for content delivery acceleration. The system 600 is used for the operations described in association with any of the computer-implement methods described previously, according to one implementation. The system 600 is intended to include various forms of digital computers, such as laptops, desktops, workstations, personal digital assistants, servers, blade servers, mainframes, and other appropriate computers. The system 600 also includes mobile devices, such as personal digital assistants, cellular telephones, smartphones, and other similar computing devices. Additionally, the system includes portable storage media, such as, Universal Serial Bus (USB) flash drives. For example, the USB flash drives may store operating systems and other applications. The USB flash drives include input/output components, such as a wireless transmitter or USB connector that may be inserted into a USB port of another computing device.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. The processor may be designed using any of a number of architectures. For example, the processor 610 may be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described is implemented in digital electronic circuitry, or in computer hardware, firmware, software, or in combinations of them. The apparatus is implemented in a computer program product tangibly embodied in an information carrier, e.g., in a machine-readable storage device for execution by a programmable processor; and method steps is performed by a programmable processor executing a program of instructions to perform functions of the described implementations by operating on input data and generating output. The described features are implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that is used, directly or indirectly, in a computer to perform a certain activity or bring about a certain result. A computer program is written in any form of programming language, including compiled or interpreted languages, and it is deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory is supplemented by, or incorporated in, ASICs (application-specific integrated circuits).

To provide for interaction with a user, the features is implemented on a computer having a display device such as a CRT (cathode ray tube) or LCD (liquid crystal display) monitor for displaying information to the user and a keyboard and a pointing device such as a mouse or a trackball by which the user provides input to the computer.

The features are implemented in a computer system that includes a back-end component, such as a data server, or that includes a middleware component, such as an application server or an Internet server, or that includes a front-end component, such as a client computer having a graphical user interface or an Internet browser, or any combination of them. The components of the system are connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system includes clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. Moreover, other mechanisms for content delivery acceleration may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A content delivery acceleration system comprising:
a data storage; and
one or more processors configured to perform operations comprising:
computing one or more evaluation results for an online resource, with the one or more evaluation results each representing one or more digital components for presentation in the online resource, wherein computing the one or more evaluation results comprises:
generating parameters data using prior evaluation data; and
performing an evaluation for each of one or more digital component slots of the online resource based on the parameters data;
storing the one or more evaluation results in the data storage; and
responsive to receiving a request for the online resource from a system configured to serve the online resource:
loading one or more content tags associated with the online resource with one or more respective links, each link indicating a digital component of the one or more digital components represented in the one or more evaluation results.

2. The content delivery acceleration system of claim 1, wherein loading the one or more content tags comprises loading the one or more content tags with the one or more links in advance of receipt of a request from a remote system for one or more evaluation results.

3. The content delivery acceleration system of claim 1, wherein computing comprises computing the one or more evaluation results in advance of receipt of a request from a remote system for the one or more evaluation results.

4. The content delivery acceleration system of claim 1, the operations further comprising:
requesting, based on the one or more evaluation results, a digital component of the one or more digital components represented by the one or more evaluation results for presentation in the online resource;
receiving the digital component; and
loading the digital component for presentation in the online resource in advance of receiving a request for the online resource so that a latency in serving the online resource is reduced, relative to a latency in serving the online resource independent of loading the digital component in advance of receiving the request for the online resource.

5. The content delivery acceleration system of claim 4, wherein loading of the digital component enables the digital component and data of the online resource to be served together.

6. The content delivery acceleration system of claim 4, wherein the digital component comprises an advertisement.

7. The content delivery acceleration system of claim 1, wherein the online resource comprises a first online resource, and wherein the operations further comprise:
receiving resource data from a remote system, the resource data being for a second online resource and comprising one or more selectable network references to one or more third online resources and the first online resource;
parsing the received resource data for the one or more selectable network references; and
for a particular one of the one or more selectable network references, generating, based on the parsed online resource data, prediction data representing a likelihood that the particular one of the one or more selectable network references representing the first online resource is selected.

8. The content delivery acceleration system of claim 7, wherein generating the prediction data comprises:
receiving a user identifier and an identifier for the first online resource;
receiving data comprising one or more of user click data for the first online resource, resource data for the first online resource, and content provider data;
analyzing the received data using one or more machine-learning algorithms; and
returning a prediction value associated with a user for the first online resource, the prediction data comprising the prediction value.

9. The content delivery acceleration system of claim 7, wherein the online resource data for the second online resource comprises one or more search results based on a search query of a user, and wherein the one or more selectable network references comprise one or more clickable links to one or more additional online resources represented by the one or more search results.

10. The content delivery acceleration system of claim 7, wherein computing the one or more evaluation results comprises:
determining a threshold value for comparing the prediction data, the threshold value representing a specified likelihood the particular one of the one or more selectable network references is selected; and
comparing the threshold value to the prediction data for the particular one of the one or more selectable network references.

11. The content delivery acceleration system of claim 1, wherein the parameters data comprise real-time bidding (RTB) callout parameters.

12. The content delivery acceleration system of claim 1, the operations further comprising:
associating, with a user identifier, the one or more evaluation results representing the one or more digital component slots associated with the online resource;
storing the user identifier;
returning, in response to a request for the one or more evaluation results for the online resource from a user associated with the user identifier, the one or more evaluation results associated with the user identifier; and
deleting, from the data storage, the one or more evaluation results associated with the user identifier.

13. A method for content delivery acceleration comprising:
computing one or more evaluation results for an online resource, with the one or more evaluation results each representing one or more digital components for presentation in the online resource, wherein computing the one or more evaluation results comprises:
generating parameters data using prior evaluation data; and
performing an evaluation for each of one or more digital component slots of the online resource based on the parameters data;
storing the one or more evaluation results in a data storage; and
responsive to receiving a request for the online resource from a system configured to serve the online resource:
loading one or more content tags associated with the online resource with one or more respective links, each link indicating a digital component of the one or more digital components represented in the one or more evaluation results.

14. The method of claim 13, wherein loading the one or more content tags comprises loading the one or more content tags with the one or more links in advance of receipt of a request from a remote system for one or more evaluation results.

15. The method of claim 13, wherein computing comprises computing the one or more evaluation results in advance of receipt of a request from a remote system for the one or more evaluation results.

16. The method of claim 13, further comprising:
requesting, based on the one or more evaluation results, a digital component of the one or more digital components represented by the one or more evaluation results for presentation in the online resource;
receiving the digital component; and
loading the digital component for presentation in the online resource in advance of receiving a request for the online resource so that a latency in serving the online resource is reduced, relative to a latency in serving the online resource independent of loading the digital component in advance of receiving the request for the online resource.

17. The method of claim 16, wherein loading of the digital component enables the digital component and data of the online resource to be served together.

18. The method of claim 16, wherein the digital component comprises an advertisement.

19. The method of claim 13, wherein the online resource comprises a first online resource, and wherein the method further comprises:
receiving resource data from a remote system, the resource data being for a second online resource and comprising one or more selectable network references to one or more third online resources and the first online resource;
parsing the received resource data for the one or more selectable network references; and
for a particular one of the one or more selectable network references, generating, based on the parsed online resource data, prediction data representing a likelihood that the particular one of the one or more selectable network references representing the first online resource is selected.

20. The method of claim 19, wherein generating the prediction data comprises:
receiving a user identifier and an identifier for the first online resource;
receiving data comprising one or more of user click data for the first online resource, resource data for the first online resource, and content provider data;
analyzing the received data using one or more machine-learning algorithms; and
returning a prediction value associated with a user for the first online resource, the prediction data comprising the prediction value.

21. The method of claim 19, wherein the online resource data for the second online resource comprises one or more search results based on a search query of a user, and wherein the one or more selectable network references comprise one or more clickable links to one or more additional online resources represented by the one or more search results.

22. The method of claim 19, wherein computing the one or more evaluation results comprises:
determining a threshold value for comparing the prediction data, the threshold value representing a specified likelihood the particular one of the one or more selectable network references is selected; and
comparing the threshold value to the prediction data for the particular one of the one or more selectable network references.

23. The method of claim 19, wherein the parameters data comprise real-time bidding (RTB) callout parameters.

24. The method of claim 13, further comprising:
associating, with a user identifier, the one or more evaluation results representing the one or more digital component slots associated with the online resource;
storing the user identifier;
returning, in response to a request for the one or more evaluation results for the online resource from a user associated with the user identifier, the one or more evaluation results associated with the user identifier; and
deleting, from the data storage, the one or more evaluation results associated with the user identifier.

25. A non-transitory computer readable medium storing instructions that are executable by one or more processors configured to perform operations comprising:
computing one or more evaluation results for an online resource, with the one or more evaluation results each representing one or more digital components for presentation in the online resource, wherein computing the one or more evaluation results comprises:
generating parameters data using prior evaluation data; and
performing an evaluation for each of one or more digital component slots of the online resource based on the parameters data;
storing the one or more evaluation results in a data storage; and
responsive to receiving a request for the online resource from a system configured to serve the online resource:
loading one or more content tags associated with the online resource with one or more respective links, each link indicating a digital component of the one or more digital components represented in the one or more evaluation results.

* * * * *